US007319756B2

(12) United States Patent
Oomen et al.

(10) Patent No.: US 7,319,756 B2
(45) Date of Patent: Jan. 15, 2008

(54) AUDIO CODING

(75) Inventors: Arnoldus Werner Johannes Oomen, Eindhoven (NL); Leon Maria Van De Kerkhof, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 856 days.

(21) Appl. No.: 10/123,665

(22) Filed: Apr. 16, 2002

(65) Prior Publication Data

US 2002/0154774 A1 Oct. 24, 2002

(30) Foreign Application Priority Data

Apr. 18, 2001 (EP) ................................ 01201405

(51) Int. Cl.
*H04K 1/00* (2006.01)
*H04N 7/167* (2006.01)

(52) U.S. Cl. ........................ 380/236; 380/237; 380/37

(58) Field of Classification Search ................ 380/236, 380/237, 238, 220, 37
See application file for complete search history.

(56) References Cited

U.S. PATENT DOCUMENTS 4,232,194 A * 11/1980 Adams ........................ 380/28
4,612,414 A * 9/1986 Juang .......................... 380/38
5,243,653 A * 9/1993 Malek et al. ............... 380/272
5,394,473 A * 2/1995 Davidson ................. 704/200.1
5,884,260 A * 3/1999 Leonhard .................... 704/254
5,886,276 A * 3/1999 Levine et al. ................. 84/603
6,081,784 A 6/2000 Tsutsui ....................... 704/501
6,266,644 B1 * 7/2001 Levine ....................... 704/503
6,424,939 B1 * 7/2002 Herre et al. ................ 704/219
6,502,069 B1 * 12/2002 Grill et al. .................. 704/219
6,845,359 B2 * 1/2005 Ramabadran ............... 704/266
6,888,943 B1 * 5/2005 Lam et al. .................. 380/268
6,904,522 B1 * 6/2005 Benardeau et al. .......... 713/156
6,925,434 B2 * 8/2005 Oomen et al. .............. 704/206
2002/0076049 A1 * 6/2002 Boykin et al. .............. 380/211

FOREIGN PATENT DOCUMENTS

DE 19907964 C 8/2000
WO WO99550089 4/1999

OTHER PUBLICATIONS

Dictionary.com, parametric (definition) <http://dictionary.reference.com/search?q=parametric> retrieved online May 15, 2006, p. 1-3.*
Edler et al, "Parametric Audio Coding", 2000, Proceedings of ICSP 2000 IEEE, pp. 21-24, retrieved online at [http://ieeexplore.ieee.org/iel5/7173/19349/00894435.pdfj] on Jan. 17, 2007.*
J. Herre et al.; "Compatible Scarmbling of Compressed Audio", Applications of Signal Processing to Audio and Acoustics, 1999 IEEE Workshop on New Paltz, NYU USA Oct. 17-20, 1999, Piscataway, NJ, pp. 27-30, XP010365060.

* cited by examiner

*Primary Examiner*—Kambiz Zand
*Assistant Examiner*—Christopher J Brown

(57) ABSTRACT

Coding of an audio signal (x) is provided where the coded bitstream (AS) comprises a parametric representation of the audio signal. One component of the parametric representation comprises tracks of linked sinusoidal components (CS) where subsequently linked components are coded differentially from parameters of linked signal components already determined. The coder scrambles (18) the differentially encoded frequency and/or amplitude values by mapping the differential values onto other differential values (CSe). By modifying these values, the bit-stream is still decode-able but results in tracks with random frequency and/or amplitude variation. Consequently, the signal will be degraded.

26 Claims, 2 Drawing Sheets

AUDIO CODING

The present invention relates to coding and decoding audio signals. In particular, the invention relates to low bit-rate audio coding as used in solid-state audio or Internet audio.

Compatible scrambling is a technique to scramble (parts of) a bit-stream in such a way that the scrambled bit-stream is still decode-able, but the decoded signal results in a degraded signal. Thus, compatible scrambling can be applied to control the quality after decoding a compressed audio bit-stream in a copy-controlled environment. This technique has been disclosed for an AAC transform coder (Advanced Audio Coding a part of the MPEG-2 standard) in "Secure Delivery of Compressed Audio by Compressed Bit-Stream Scrambling", E. Allamanche and J. Herre, AES 108th Convention, Paris, 2000 Feb. 19-22.

Here, the AAC bit-stream is encrypted with a key such, that for no increase in bit-rate, the quality can be set to any required level (below the quality obtained for the unscrambled stream). If the encryption key is known (by means of some transaction), the bitstream can be decrypted to its original state. Allamanche also states that this method of compatible scrambling is also applicable to other compression schemes.

However, for an AAC transform coder, or any other waveform coder, the spectrum is typically encoded using a coarse and a fine spectral representation. A set of scale-factors is used to describe a coarse representation of the spectrum and a fine division in between subsequent scale-factors is used to describe the fine structure of the spectrum. The compatible scrambling in Allamanche is done by modifying (scrambling) the fine structure of the spectrum to an extent that a certain lower quality level signal is obtained.

For a parametric coding scheme, for example, the sinusoidal coder type described in PCT patent application No. PCT/EP00/05344 (Attorney Ref: N 017502) and simultaneously filed European Patent Application No. 01201404.9 (Attorney Ref: PHNL010252), the signal components are not described in terms of a coarse and a fine spectral representation. Rather, sinusoidal parameters describe so-called tracks, which are sinusoids that start at a specific time instance, evolve for a certain amount of time and then stop. In the period that the sinusoid is active, the evolution is typically slowly varying. Therefore, the compatible scrambling techniques as proposed in Allamanche are not applicable to a sinusoidal coding scheme.

According to the present invention there is provided a method of encoding an audio signal, the method comprising the steps of: sampling the audio signal to generate sampled signal values; analysing the sampled signal values to generate a parametric representation of the audio signal; encrypting at least some of the parameters of said parametric representation; and generating an encoded audio stream including said encrypted parametric representation representative of said audio signal which enables said audio signal to be synthesized from said encoded audio stream at a lower quality level than would be produced using an unencrypted parametric representation.

In a preferred embodiment of the invention, the parametric representation includes codes representing sustained sinusoidal components of the audio signal, for which frequency and/or amplitude parameters are updated differentially during the period that a sinusoid is active. To scramble the differential encoded frequency and/or amplitude values, the differential values are mapped onto other differential values. By modifying these values, the bit-stream is still decode-able but results in tracks with random frequency and/or amplitude variation. Consequently, the signal will be degraded.

Various embodiments of the invention will now be described with reference to the accompanying drawings, in which.

Figure 1:
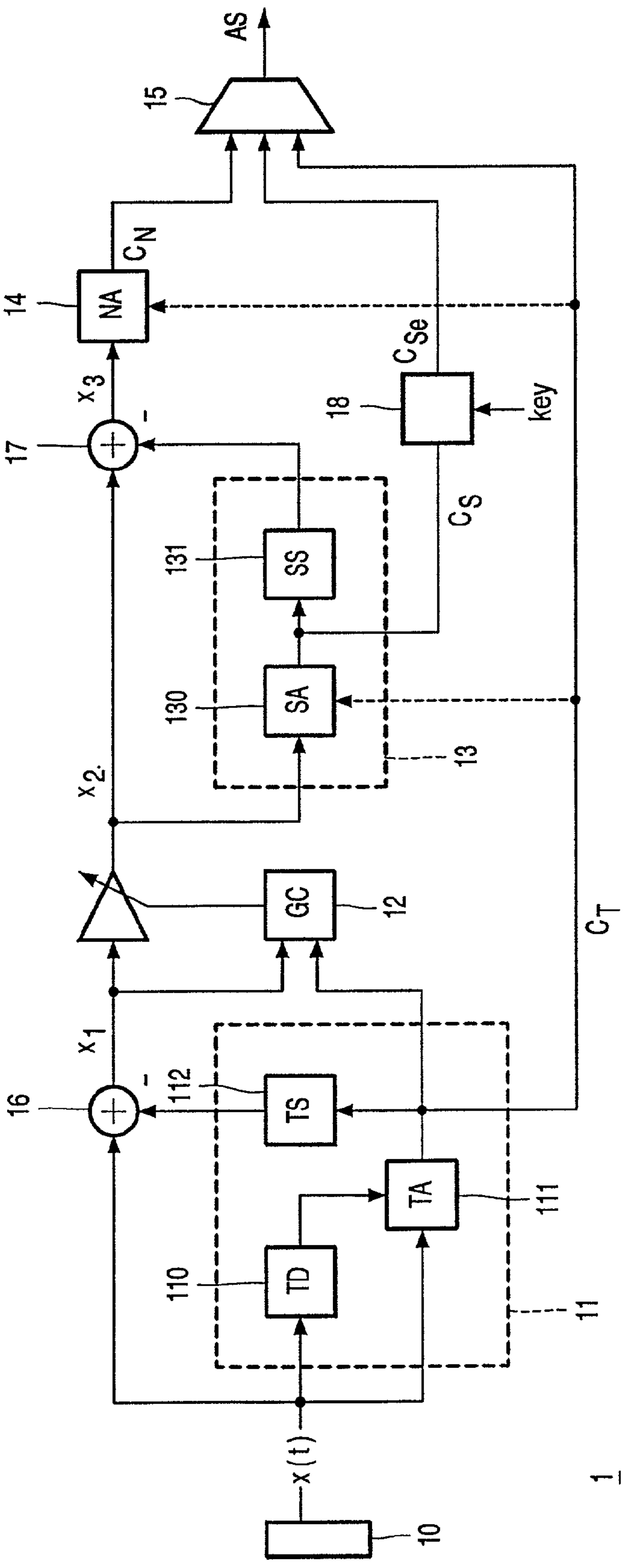
FIG. 1 shows an embodiment of an audio coder according to the invention.

In a preferred embodiment of the present invention, the application of compatible scrambling for a parametric coding scheme is described, FIG. 1, where the encoder is a sinusoidal coder of the type described in European patent application No. 00200939.7, filed 15.03.2000 (Attorney Ref: PH-NL000120) or simultaneously filed European Patent Application No. 01201404.9 (Attorney Ref: PHNL010252). In both the related cases and the preferred embodiment, the audio coder 1 samples an input audio signal at a certain sampling frequency resulting in a digital representation x(t) of the audio signal. This renders the time-scale t dependent on the sampling rate. The coder 1 then separates the sampled input signal into three components: transient signal components, sustained deterministic (sinusoidal) components, and sustained stochastic (noise) components. The audio coder 1 comprises a transient coder 11, a sinusoidal coder 13 and a noise coder 14. The audio coder optionally comprises a gain compression mechanism (GC) 12.

In this embodiment of the invention, transient coding is performed before sustained coding. This is advantageous because transient signal components are not efficiently and optimally coded in sustained coders. If sustained coders are used to code transient signal components, a lot of coding effort is necessary; for example, one can imagine that it is difficult to code a transient signal component with only sustained sinusoids. Therefore, the removal of transient signal components from the audio signal to be coded before sustained coding is advantageous. It will also be seen that a transient start position derived in the transient coder may be used in the sustained coders for adaptive segmentation (adaptive framing).

Nonetheless, the invention is not limited to the particular use of transient coding disclosed in the European patent application No. 00200939.7 and this is provided for exemplary purposes only.

The transient coder 11 comprises a transient detector (TD) 110, a transient analyzer (TA) 111 and a transient synthesizer (TS) 112. First, the signal x(t) enters the transient detector 110. This detector 110 estimates if there is a transient signal component and its position. This information is fed to the transient analyzer 111. This information may also be used in the sinusoidal coder 13 and the noise coder 14 to obtain advantageous signal-induced segmentation. If the position of a transient signal component is determined, the transient analyzer 111 tries to extract (the main part of) the transient signal component. It matches a shape function to a signal segment preferably starting at an estimated start position, and determines content underneath the shape function, by employing for example a (small) number of sinusoidal components. This information is contained in the transient code CT and more detailed information on generating the transient code CT is provided in European patent application No. 00200939.7.

In any case, it will be seen that where, for example, the transient analyser employs a Meixner like shape function, then the transient code CT will comprise the start position at which the transient begins; a parameter that is substantially indicative of the initial attack rate; and a parameter that is substantially indicative of the decay rate; as well as frequency, amplitude and phase data for the sinusoidal components of the transient.

If the bitstream produced by the coder 1 is to be synthesized by a decoder independently of the sampling frequency used to generate the bitstream, then the start position should be transmitted as a time value rather than, for example, a sample number within a frame; and the sinusoid frequencies should be transmitted as absolute values or using identifiers indicative of absolute values rather than values only derivable from or proportional to the transformation sampling frequency. Nonetheless, as will be seen later, the present invention can be implemented with any of the above schemes.

It will also be seen that the shape function may also include a step indication in case the transient signal component is a step-like change in amplitude envelope. In this case, the transient position only affects the segmentation during synthesis for the sinusoidal and noise module. Again, although the invention is not limited to either implementation, the location of the step-like change may be encoded as a time value rather than a sample number, which would be related to the sampling frequency.

The transient code CT is furnished to the transient synthesizer 112. The synthesized transient signal component is subtracted from the input signal x(t) in subtractor 16, resulting in a signal x1. In case, the GC 12 is omitted, x1=x2. The signal x2 is furnished to the sinusoidal coder 13 where it is analyzed in a sinusoidal analyzer (SA) 130, which determines the (deterministic) sinusoidal components. The resulting information is contained in the sinusoidal code CS and a more detailed example illustrating the generation of an exemplary sinusoidal code CS is provided in PCT patent application No. PCT/EP00/05344 (Attorney Ref: N 017502). Alternatively, a basic implementation is disclosed in "Speech analysis/synthesis based on sinusoidal representation", R. McAulay and T. Quartieri, IEEE Trans. Acoust., Speech, Signal Process., 43:744-754, 1986 or "Technical description of the MPEG-4 audio-coding proposal from the University of Hannover and Deutsche Bundespost Telekom AG (revised)", B. Edler, H. Purnhagen and C. Ferekidis, Technical note MPEG95/0414r, Int. Organisation for Standardisation ISO/IEC JTC1/SC29/WG11, 1996.

In brief, however, the sinusoidal coder of the preferred embodiment encodes the input signal x2 as tracks of sinusoidal components linked from one frame segment to the next. These tracks start at a specific time instance, evolve for a certain amount of time and then stop. Updates to these tracks from one segment to the next are described in terms of frequencies, amplitudes and optionally phase information. In the period that the sinusoid is active, the evolution is typically slowly varying. For that reason it is very bit-rate efficient to update the frequency and amplitude parameters differentially. Thus, the tracks are initially represented by a start frequency, a start amplitude and a start phase for a sinusoid beginning in a given segment—a birth. Thereafter, the track is represented in subsequent segments by frequency differences, amplitude differences and, possibly, phase differences (continuations) until the segment in which the track ends (death). In practice, it may be determined that there is little gain in coding phase differences. Thus, phase information need not be encoded for continuations at all and phase information may be regenerated using continuous phase reconstruction.

Again, if the bitstream is to be made sampling frequency independent, the start frequencies are encoded within the sinusoidal code CS as absolute values or identifiers indicative of absolute frequencies to ensure the encoded signal is independent of the sampling frequency.

From the sinusoidal code CS, the sinusoidal signal component is reconstructed by a sinusoidal synthesizer (SS) 131. This signal is subtracted in subtractor 17 from the input x2 to the sinusoidal coder 13, resulting in a remaining signal x3 devoid of (large) transient signal components and (main) deterministic sinusoidal components.

The remaining signal x3 is assumed to mainly comprise noise and the noise analyzer 14 of the preferred embodiment produces a noise code CN representative of this noise. Conventionally, as in, for example, PCT patent application No. PCT/EP00/04599, filed May 17, 2000 (Attorney Ref: PH NL000287) a spectrum of the noise is modelled by the noise coder with combined AR (auto-regressive) MA (moving average) filter parameters (pi,qi) according to an Equivalent Rectangular Bandwidth (ERB) scale. Within the decoder, FIG. 2, the filter parameters are fed to a noise synthesizer NS 33, which is mainly a filter, having a frequency response approximating the spectrum of the noise. The NS 33 generates reconstructed noise yN by filtering a white noise signal with the ARMA filtering parameters (pi,qi) and subsequently adds this to the synthesized transient yT and sinusoid yS signals described later.

However, the ARMA filtering parameters (pi,qi) are again dependent on the sampling frequency of the noise analyser and, if the coded bitstream is to be independent of the sampling frequency, these parameters are transformed into line spectral frequencies (LSF) also known as Line Spectral Pairs (LSP) before being encoded. These LSF parameters can be represented on an absolute frequency grid or a grid related to the ERB scale or Bark scale. More information on LSP can be found at "Line Spectrum Pair (LSP) and speech data compression", F. K. Soong and B. H. Juang, ICASSP, pp. 1.10.1, 1984. In any case, such transformation from one type of linear predictive filter type coefficients (in this case (pi,qi) dependent on the encoder sampling frequency) into LSFs which are sampling frequency independent and vice versa (as is required in the decoder) is well known and is not discussed further here. However, it will be seen that converting LSFs into filter coefficients (p'i,q'i) within the decoder can be done with reference to the frequency with which the noise synthesizer 33 generates white noise samples, so enabling the decoder to generate the noise signal yN independently of the manner in which it was originally sampled.

It will be seen that, similar to the situation in the sinusoidal coder 13, the noise analyzer 14 may also use the start position of the transient signal component as a position for starting a new analysis block. Thus, the segment sizes of the sinusoidal analyzer 130 and the noise analyzer 14 are not necessarily equal.

Nonetheless, as will be seen below, the present invention can be implemented with any noise encoding scheme including any of the schemes referred to above.

In the preferred embodiment of the present invention, scrambling is performed on the sinusoidal code CS produced by the sinusoidal analyser 130. In particular, in the preferred embodiment, an enciphering module 18 is disposed between the sinusoidal analyser 130 and a multiplexer 15. The enciphering module 18 scrambles the differential encoded frequency and/or amplitude values of the sinusoidal code CS for track continuation segments using a key provided. In other words, the module 18 maps the differential values onto other differential values to produce an encrypted sinusoidal code CSe. By modifying these values, the bit-stream comprising the codes CSe is still decode-able but results in tracks with randomised frequency variation and/or randomised amplitude variation over the life of a track. Consequently, without the correct key, the quality of synthesized signal produced by a decoder will be degraded.

The amount of degradation can be controlled by the amount and range over which these differentially encoded frequencies and/or amplitudes are modified. So, for example, it may be decided that certain types of audio signal are more sensitive to scrambling than others and similarly, that certain types of signal are more sensitive to frequency scrambling than amplitude scrambling. So, if a signal comprises a large sinusoidal component and as, in the case of classical music, tracks would be inclined to be long, i.e. they extend over a number of segments, and so they may be more sensitive to scrambling, than, for example, some forms of more modern popular music. Thus, the key and so the mapping used to perform the scrambling can be chosen accordingly.

Finally, in the multiplexer 15, an audio stream AS is constituted which includes the codes CT, CSe and CN. The audio stream AS is furnished to e.g. a data bus, an antenna system, a storage medium etc. It will be seen therefore that only the encrypted version of the signal is transmitted or stored.

Figure 2:
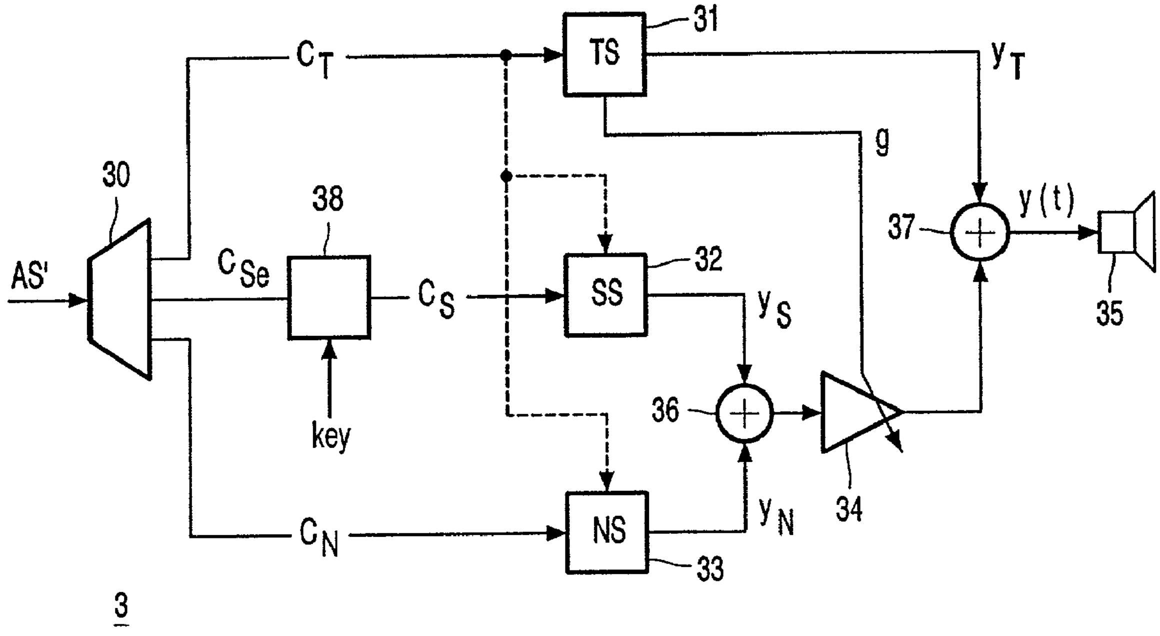
FIG. 2 shows an embodiment of an audio player according to the invention.

FIG. 2 shows an audio player 3 according to the invention. An audio stream AS', generated either by an encoder according to FIG. 1 or a non-scrambling encoder, is obtained from the data bus, antenna system, storage medium etc. The audio stream AS is demultiplexed in a de-multiplexer 30 to obtain the codes CT, CSe and CN. The CT and CN codes are furnished to a transient synthesizer 31 and a noise synthesizer 33 respectively as in European patent application No. 00200939.7. From the transient code CT, the transient signal components are calculated in the transient synthesizer 31. In case the transient code indicates a shape function, the shape is calculated based on the received parameters. Further, the shape content is calculated based on the frequencies and amplitudes of the sinusoidal components. If the transient code CT indicates a step, then no transient is calculated. The total transient signal yT is a sum of all transients.

If adaptive framing is used, then from the transient positions, a segmentation for the sinusoidal synthesis SS 32 and the noise synthesis NS 33 is calculated. The noise code CN is used to generate a noise signal yN. To do this, the line spectral frequencies for the frame segment are first transformed into ARMA filtering parameters (p'i,q'i) dedicated for the frequency at which the white noise is generated by the noise synthesizer and these are combined with the white noise values to generate the noise component of the audio signal. In any case, subsequent frame segments are added by, e.g. an overlap-add method.

In accordance with the present invention, however, if a deciphering key is available, the CSe codes are assumed to have been scrambled and are first fed to a deciphering module 38. The deciphering module applies the key, acquired through conventional transaction techniques, to the encrypted CSe codes to produce unscrambled codes CS. It will be seen that once the correct key is provided to the decoder and so to deciphering module 38, the decoder need not otherwise be aware that the bitstream has been scrambled or the particular mapping chosen when encoding the signal.

If no key is available, for example, where the bitstream has not been scrambled or where the key simply has not been obtained, then the sinusoidal code CS, unaltered from the CSe codes provided, is used to generate signal yS, described as a sum of sinusoids on a given segment.

If the bitstream has not been scrambled, then it will be synthesized at its original sampled quality, as presumably no key will have been provided.

On the other hand, if the correct key is available for a scrambled signal, then sinusoidal codes CS corresponding to the original codes produced by the code analyser 130 are generated and these can be provided to the synthesizer 32 to generate signal yS.

The total signal y(t) comprises the sum of the transient signal yT and the product of any amplitude decompression (g) and the sum of the sinusoidal signal yS and the noise signal yN. The audio player comprises two adders 36 and 37 to sum respective signals. The total signal is furnished to an output unit 35, which is e.g. a speaker.

So, where no key is available or the wrong key is used, a degraded signal y(t) by comparison to the originally sampled signal x(t) will result. On the other hand, if the correct key is used, the sinusoidal component of the signal y(t) will be synthesized at the original sampled quality so producing the total signal at the original quality.

Figure 3:
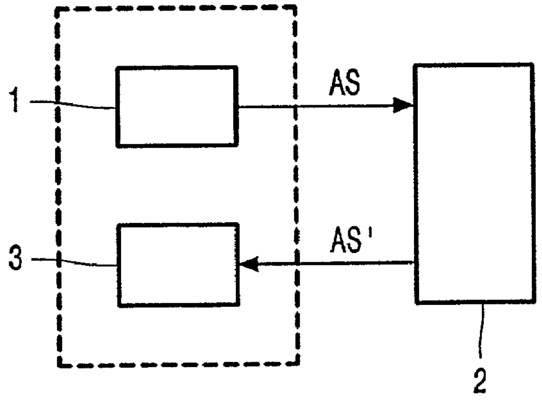
FIG. 3 shows a system comprising an audio coder and an audio player.

FIG. 3 shows an audio system according to the invention comprising an audio coder 1 as shown in FIG. 1 and an audio player 3 as shown in FIG. 2. Such a system offers playing and recording features, but prevents unauthorised copying of original quality material. The encrypted audio stream AS is furnished from the audio coder to the audio player over a communication channel 2, which may be a wireless connection, a data 20 bus or a storage medium. In case the communication channel 2 is a storage medium, the storage medium may be fixed in the system or may also be a removable disc, solid state storage device such as a Memory Stick™ from Sony Corporation etc. The communication channel 2 may be part of the audio system, but will however often be outside the audio system.

It will be seen that variations of the preferred embodiment are also possible. For example, while on the one hand the noise component CN usually contributes a relatively small component of the overall signal and so its absence may not prove to be unacceptable to a listener, scrambling of the noise component to say randomly offset the spectral frequencies of the noise component of the signal may provide the required effect. Thus, an enciphering module (not shown) may be disposed between the noise analyser 14 and the multiplexer 15 in addition or alternatively to the module 18. Within the decoder, a corresponding deciphering module (not shown) is then additionally or alternatively disposed between the de-multiplexer and the noise synthesizer 33 to de-scramble (if a key is provided) the noise codes from the bitstream.

Furthermore, while on the one hand transient components CT are typically only periodically encoded within the bitstream and so their absence may not prove to be unacceptable to a listener, again scrambling of the transients component to say randomly offset the amplitude and frequency parameters of the sinusoidal parameters which are weighted by the envelope function may provide the required effect. Thus, an enciphering module (not shown) may be disposed between the transient analyser 111 and the multiplexer in addition or alternatively to the module 18 and/or any noise scrambling module. Within the decoder, a corresponding deciphering module (not shown) is then additionally or alternatively disposed between the de-multiplexer 30 and the transient synthesizer 31 to descramble (or not) the transient codes from the bitstream.

It should also be noted that in implementing the invention, scrambling of the codes CS, CT or CN may occur before or after any quantization of the code performed prior to multiplexing.

Also, as mentioned above, both the enciphering and deciphering modules may operate in any number of manners. So for example, the key need not simply be applied directly to the bitstream, rather it may in fact be used to encrypt and decrypt a mapping used to scramble and descramble the signal. Nonetheless, the composite mapping and key can be thought of as the key of the invention.

The present invention finds application where copyright management for compressed audio is desired, for example, SSA (Solid State Audio), EMD (Electronic Music Distribution), Super distribution and Internet.

It is observed that the present invention can be implemented in dedicated hardware, in software running on a DSP or on a general purpose computer. The present invention can be embodied in a tangible medium such as a CD-ROM or a DVD-ROM carrying a computer program for executing an encoding method according to the invention. The invention can also be embodied as a signal transmitted over a data network such as the Internet, or a signal transmitted by a broadcast service.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

In summary, coding of an audio signal is provided where the coded bitstream comprises a parametric representation of the audio signal. One component of the parametric representation comprises tracks of linked sinusoidal components where subsequently linked components are coded differentially from parameters of linked signal components already determined. The coder scrambles the differentially encoded frequency and/or amplitude values by mapping the differential values onto other differential values. By modifying these values, the bit-stream is still decode-able but results in tracks with random frequency and/or amplitude variation. Consequently, the signal will be degraded.

The invention claimed is:

1. A method of encoding an audio signal, the method comprising the acts of:

sampling the audio signal to generate sampled signal values;

analyzing the sampled signal values to generate a parametric representation of the audio signal, said parametric representation comprising separate transient, sinusoidal and noise components;

separately encrypting each of at least one of the components of said parametric representation; and generating an encoded audio stream including said encrypted parametric representation of said audio signal which enables said audio signal to be synthesized from said encoded audio stream at a lower quality level than would be produced using an unencrypted parametric representation, wherein the act of separately encrypting each of at least one of the components of said parametric representation occurs prior to quantization of the audio signal.

2. The method as claimed in claim 1, the method further comprising the act of:

modeling a sustained signal component of the audio signal by a) determining tracks representative of linked signal components present in successive signal segments and b) extending tracks on the basis of parameters of linked signal components already determined and wherein said encrypting act comprises scrambling the parameters of said linked signal components with a cryptographic key.

3. The method as claimed in claim 2 wherein the parameters for a first signal component in a track include a parameter representative of an absolute frequency of said signal component and wherein said encrypting act comprises scrambling the parameters of subsequent signal segments with said cryptographic key.

4. The method as claimed in claim 3 wherein said parameters of subsequent signal segments comprise differential amplitude and frequency values from parameters of linked signal components already determined and wherein said encrypting act comprises scrambling said amplitude and/or frequency differences.

5. The method as claimed in claim 1 wherein said generating act provides a parametric representation independent of a first sampling frequency so allowing said audio signal to be synthesized independently of said first sampling frequency.

6. The method as claimed in claim 1, the method further comprising the act of:

modeling a noise component of the audio signal by determining filter parameters of a filter which has a frequency response approximating a target spectrum of the noise component.

7. The method as claimed in claim 6 wherein said encrypting act comprises scrambling said filter parameters.

8. The method as claimed in claim 6 comprising the act of converting the filter parameters to parameters independent of a first sampling frequency.

9. The method as claimed in claim 8 wherein said filter parameters are auto-regressive and moving average parameters and said independent parameters are indicative of Line Spectral Frequencies.

10. The method as claimed in claim 8 wherein said encrypting act comprises scrambling said independent parameters.

11. The method as claimed in claim 9 wherein said independent parameters are represented in one of absolute frequencies or a Bark scale or an ERB scale.

12. The method as claimed in claim 1 wherein said method further comprises the acts of:

estimating a position of a transient signal component in the audio signal; and matching a shape function having shape parameters and a position parameter to said transient signal;

wherein said encrypting act comprises scrambling said position and/or shape parameters; and wherein said generating act includes the encrypted position and shape parameters in said audio stream.

13. The method as claimed in claim 12 wherein said position parameter is representative of an absolute time location of said transient signal component in said audio signal.

14. The method as claimed in claim 12, wherein said matching act is responsive to said transient signal component being a step-like change in amplitude to provide a shape function indicating a step transient.

15. A method of decoding an audio stream, the method comprising the acts of:

reading an encoded audio stream representative of an audio signal including a parametric representation of the audio signal, said parametric representation comprising separate transient, sinusoidal and noise components;

responsive to the availability of a key, separately decrypting each of at least one of the components of said parametric representation with said key to create a decrypted parametric representation; and employing said decrypted parametric representation to synthesize said audio signal, wherein the act of separately decrypting each of at least one of the components of said parametric representation occurs after inverse quantization of the audio signal.

16. An audio coder, comprising:

a sampler for sampling an audio signal to generate sampled signal values;

an analyzer for analyzing the sampled signal values to generate a parametric representation of the audio signal, said parametric representation comprising a separate transient, sinusoidal and noise components;

an encryption module for separately scrambling each of at least one of the components of said parametric representation prior to quantization of the audio signal; and a bit stream generator for generating an encoded audio stream including said encrypted parametric representation of said audio signal which enables said audio signal to be synthesized from said encoded audio stream at a lower quality level than would be produced using an unencrypted parametric representation.

17. An audio player, comprising:

means for reading an encoded audio stream representative of an audio signal including a parametric representation of the audio signal, said parametric representation comprising separate transient, sinusoidal and noise components;

means, responsive to the availability of a key, for separately decrypting each of at least one of the components of said parametric representation with said key to create a decrypted parametric representation after inverse quantization of the audio signal; and a synthesizer arranged to employ said decrypted parametric representation to synthesize said audio signal.

18. An audio system comprising the audio coder as claimed in claim 16.

19. An encoded audio stream comprising a parametric representation of an audio signal, said parametric representation comprising separate transient, sinusoidal and noise components wherein each of at least one of the components of said parametric representation is encrypted separate from each other of the at least one of the components prior to quantization of the audio signal and wherein the components together comprise a playable audio signal, said encoded audio stream being arranged to enable an audio player to play said audio signal from said audio stream at a lower quality level than would be produced using an unencrypted parametric representation.

20. A device readable storage medium on which an audio stream as claimed in claim 19 has been stored.

21. The method of claim 15 wherein said act of separately decrypting further comprises using a separate decrypting key for each decrypted component.

22. The method as claimed in claim 1, wherein the act of separately encrypting each of at least one of the components of said parametric representation comprises the act of:

separately encrypting each of at least two of the components of said parametric representation.

23. The method as claimed in claim 15, wherein the act of separately decrypting each of at least one of the components of said parametric representation comprises the act of:

separately decrypting each of at least two of the components of said parametric representation.

24. The coder as claimed in claim 16, wherein the encryption module is configured for separately scrambling each of at least two of the components of said parametric representation.

25. The audio player as claimed in claim 17, wherein the means for separately decrypting each of at least one of the components of said parametric representation with said key to create a decrypted parametric representation is a means for separately decrypting each of at least two of the components of said parametric representation with said key.

26. The encoded audio stream as claimed in claim 19, wherein each of at least two of the components of said parametric representation is encrypted separate from each other of the components.

* * * * *